(12) United States Patent
Qiao et al.

(10) Patent No.: US 11,878,896 B2
(45) Date of Patent: Jan. 23, 2024

(54) ELECTRIC WINDER AND METHOD FOR CONTROLLING SAME

(71) Applicant: INTRADIN (HUZHOU) PRECISION TECHNOLOGY CO., LTD., Zhejiang (CN)

(72) Inventors: Xuetao Qiao, Zhejiang (CN); Gaofeng Wang, Zhejiang (CN); Jisheng Ning, Zhejiang (CN)

(73) Assignee: INTRADIN (HUZHOU) PRECISION TECHNOLOGY CO., LTD., Huzhou (CN)

( * ) Notice: Subject to any disclaimer, the term of this patent is extended or adjusted under 35 U.S.C. 154(b) by 218 days.

(21) Appl. No.: 17/514,363

(22) Filed: Oct. 29, 2021

(65) Prior Publication Data

US 2022/0048727 A1  Feb. 17, 2022

(30) Foreign Application Priority Data

Feb. 2, 2021 (CN) .......................... 202110142110.1

(51) Int. Cl.
*B65H 75/44* (2006.01)
*H02G 11/02* (2006.01)

(52) U.S. Cl.
CPC ..... *B65H 75/4484* (2013.01); *B65H 75/4471* (2013.01); *B65H 75/4486* (2013.01); *B65H 2701/34* (2013.01); *H02G 11/02* (2013.01)

(58) Field of Classification Search
CPC .... B65H 75/00; B65H 75/40; B65H 75/4418; B65H 75/4428; B65H 75/4436; B65H 75/4442; B65H 75/4457; B65H 75/4468; B65H 75/4471; B65H 75/4481; B65H 75/4484; B65H 75/4486; B65H 2701/34; B65H 18/00; B65H 18/02; B65H 18/08; B65H 18/14; H02G 11/02; H01R 13/66; H01R 13/6683; H01R 13/6691; H01R 13/71; H01R 13/72; H01R 13/703; H01R 13/7039; H01R 13/713; H01R 13/641; H01R 13/6453; G05B 2219/40625
USPC ............................................. 439/4, 501, 174
See application file for complete search history.

(56) References Cited

U.S. PATENT DOCUMENTS

| 3,369,084 A | * | 2/1968 | Cook ..................... B65H 75/40 |
| | | | 191/12.4 |
| 3,372,887 A | * | 3/1968 | Ladany .............. B65H 75/4449 |
| | | | 439/4 |
| 3,837,448 A | * | 9/1974 | Hagstrom .......... B65H 75/4471 |
| | | | 191/12.4 |

(Continued)

FOREIGN PATENT DOCUMENTS

| KR | 101151930 B1 * | 6/2012 | ............. H02G 11/02 |
| WO | 2012060008 A1 | 5/2012 | |

*Primary Examiner* — Michael R Mansen
*Assistant Examiner* — Raveen J Dias

(57) ABSTRACT

The disclosure provides an electric winder and a method for controlling the same. The electric winder includes a winder body, a socket and a controller. When a plug is inserted into the contact assembly through the insertion hole, the strain sensor is configured to detect a deformation of the contact assembly caused by the plug, and send the deformation to the controller. The controller is configured to receive the deformation sent from the strain sensor. When the deformation is greater than a deformation threshold, the controller controls the drive mechanism to be in a stop state to prevent the reel from winding.

10 Claims, 5 Drawing Sheets

(56) References Cited

U.S. PATENT DOCUMENTS

| | | | | |
|---|---|---|---|---|
| 3,876,045 A * | 4/1975 | Knarreborg | H02G 11/02 | 242/395 |
| 3,920,308 A * | 11/1975 | Murray | H02G 11/02 | 439/501 |
| 4,083,621 A * | 4/1978 | Davidson | H02G 11/02 | 439/501 |
| 4,114,736 A * | 9/1978 | Scherenberg | H02G 11/02 | 242/385.4 |
| 4,338,497 A * | 7/1982 | Drew | H02G 11/02 | 439/4 |
| 4,721,833 A * | 1/1988 | Dubay | B65H 75/4486 | 242/390.8 |
| 5,679,925 A * | 10/1997 | Dilley | H02G 3/123 | 174/53 |
| 5,723,815 A * | 3/1998 | Pena | H02G 11/02 | 174/53 |
| 6,149,096 A * | 11/2000 | Hartley | B65H 75/4402 | 191/12.2 A |
| 6,669,135 B1 * | 12/2003 | Hartley | B65H 75/40 | 191/12.2 A |
| 6,942,079 B2 * | 9/2005 | Chang | B65H 75/4431 | 191/12.4 |
| 7,309,834 B1 * | 12/2007 | Byrd | H02G 11/02 | 174/53 |
| 8,771,005 B2 * | 7/2014 | Tracey | B65H 75/40 | 439/445 |
| 8,801,458 B2 * | 8/2014 | Ceraldi | B65H 75/4471 | 439/954 |
| 8,878,397 B2 * | 11/2014 | Tracey | H01H 37/72 | 307/147 |
| 8,925,851 B2 * | 1/2015 | Tracey | B65H 75/4463 | 242/406 |
| 9,368,303 B2 * | 6/2016 | Tracey | H01H 37/72 | |
| 9,793,699 B2 * | 10/2017 | Yun | H02G 11/02 | |
| 11,565,908 B2 * | 1/2023 | Qiao | B65H 75/4484 | |
| 2005/0072645 A1 * | 4/2005 | Kovacik | H02G 11/02 | 191/12.2 R |
| 2005/0098405 A1 * | 5/2005 | Chang | B65H 75/4431 | 191/12.2 R |
| 2006/0027155 A1 | 2/2006 | Welch | | |
| 2006/0186255 A1 * | 8/2006 | Rooker | B65H 75/4468 | 242/395 |
| 2007/0176045 A1 * | 8/2007 | Chen | B65H 75/40 | 242/614 |
| 2007/0194163 A1 * | 8/2007 | Okonsky | H02G 11/02 | 242/398 |
| 2008/0111013 A1 * | 5/2008 | Suckle | B65H 75/4468 | 242/370 |
| 2008/0197226 A1 * | 8/2008 | Cooper | B65H 75/4471 | 242/370 |
| 2010/0084500 A1 * | 4/2010 | Inman | B65H 75/4471 | 242/390.8 |
| 2010/0319157 A1 * | 12/2010 | Lee | A47L 9/26 | 15/323 |
| 2012/0049653 A1 * | 3/2012 | Tracey | B65H 75/4471 | 307/117 |
| 2012/0138167 A1 * | 6/2012 | Zuppardo | B65H 75/38 | 242/395 |
| 2012/0267466 A1 * | 10/2012 | Tracey | B65H 75/4471 | 242/390.9 |
| 2013/0032654 A1 * | 2/2013 | Tracey | H02G 3/02 | 242/390.8 |
| 2013/0032655 A1 * | 2/2013 | Tracey | B65H 75/4463 | 242/406 |
| 2013/0098725 A1 * | 4/2013 | Yun | B65H 75/48 | 242/390.8 |
| 2013/0171865 A1 * | 7/2013 | Ceraldi | B65H 75/4471 | 439/501 |
| 2013/0171866 A1 * | 7/2013 | Tracey | H01R 13/516 | 439/892 |
| 2015/0008274 A1 * | 1/2015 | Mizuno | B65H 75/28 | 242/404 |
| 2015/0008878 A1 * | 1/2015 | Mizuno | B65H 75/4415 | 320/109 |
| 2015/0014128 A1 * | 1/2015 | Mizuno | H01H 1/36 | 200/51.09 |
| 2015/0014464 A1 * | 1/2015 | Dohara | B65H 75/40 | 242/405.3 |
| 2015/0097066 A1 * | 4/2015 | Knudsen | H02G 11/02 | 242/400 |
| 2015/0123494 A1 * | 5/2015 | Tracey | B65H 75/40 | 307/117 |
| 2019/0006833 A1 * | 1/2019 | Hall | G05B 15/02 | |
| 2021/0238007 A1 * | 8/2021 | Wilson | B65H 75/4484 | |
| 2021/0300719 A1 * | 9/2021 | Qiao | H02G 11/02 | |

* cited by examiner

ELECTRIC WINDER AND METHOD FOR CONTROLLING SAME

CROSS-REFERENCE TO RELATED APPLICATIONS

This application claims the benefit of priority from Chinese Patent Application No. 202110142110.1, filed on Feb. 2, 2021. The content of the aforementioned application, including any intervening amendments thereto, is incorporated herein by reference in its entirety.

TECHNICAL FIELD

This application relates to cable retraction, and more particularly to an electric winder and a method for controlling the same.

BACKGROUND

The electric winder is a device for the long-distance transmission of cables. One end of the electric winder is connected to an external power source, and the other end is used to supply power to a remote external tool by extending a free end of the cable. In the prior art, the socket on the free end of the cable and the plug on the tool are energized when the cable is in use, and at this time, the electric winder will not retract the cable. However, once the user does not operate properly, for example, when the user first unplugs the electric winder, the socket on the free end of the cable fails to electrically connect the plug on the tool, and then the electric winder will retract the cable. At this time, since the plug on the tool is still inserted in the socket of the free end of the cable, the socket on the free end of the cable drives the plug on the tool to move in the retracting process. Therefore, it is easy to damage the socket on the free end of the cable or the plug on the tool. Moreover, the tool attached to the socket of the free end of the cable is prone to being pulled down and damaged.

SUMMARY

An object of this application is to provide an electric winder and a method for controlling the same to overcome the problem in the prior art that improper operations of users may cause the socket on the free end of the cable to drive the plug on the tool to move, thereby easily damaging the socket on the free end of the cable or the plug on the tool.

To overcome the problem mentioned above, the present disclosure adopts the following technical solutions.

In a first aspect, this application provides an electric winder, comprising:
 a winder body, comprising:
  a first housing;
  a reel arranged in the first housing;
  a drive mechanism connected to the reel; and
  a cable wound on the reel;
 a socket, comprising:
  a second housing;
  an insertion hole provided on a side of the second housing;
  a contact assembly provided in the insertion hole; and
  a strain sensor arranged in the second housing and attached to the contact assembly; and
 a controller, configured to control on/off of the drive mechanism;

characterized in that the second housing is arranged outside the first housing, and the contact assembly is connected to a free end of the cable; the controller is connected to the strain sensor; when a plug is inserted into the contact assembly through the insertion hole, the strain sensor is configured to detect a deformation of the contact assembly caused by the plug, and send the deformation to the controller; and
 the controller is configured to receive the deformation sent from the strain sensor; and when the deformation is greater than a deformation threshold, the controller controls the drive mechanism to be in a stop state to prevent the reel from winding.

In some embodiments, the contact assembly comprises a first conductive contact and a second conductive contact opposite to each other, and the strain sensor is attached to the first conductive contact and the second conductive contact, respectively; when the plug is inserted between the first conductive contact and the second conductive contact through the insertion hole, the strain sensor is configured to detect deformations of the first conductive contact and the second conductive contact caused by the plug and send the deformations to the controller.

In some embodiments, a guide portion is provided at an end of the contact assembly close to the insertion hole.

In some embodiments, an end of the first conductive contact close to the insertion hole is bent towards a side away from the second conductive contact to form a first bending portion; and an end of the second conductive contact close to the insertion hole is bent towards a side away from the first conductive contact to form a second bending portion; and the first bending portion and the second bending portion together form the guide portion.

In some embodiments, the socket further comprises a first attraction member arranged on a side surface of the second housing, and the plug is provided with a second attraction member for attracting the first attraction member; and one of the first attraction member and the second attraction member is a magnetic element, and the other is a magnetic conductive element.

In some embodiments, the insertion hole comprises a first insertion opening, a second insertion opening and a third insertion opening which are arranged in a triangle shape; the first attraction member is arranged at a center of the triangle formed by the first insertion opening, the second insertion opening and the third insertion opening, and has a safety distance away from the first insertion opening, the second insertion opening and the third insertion opening respectively; and the second attraction member is arranged at a position corresponding to the first attraction member.

In some embodiments, a first groove is provided at the center of the triangle formed by the first insertion opening, the second insertion opening and the third insertion opening, and the first attraction member is arranged in the first groove; the plug is provided with a second groove at a position corresponding to the first attraction member, and the second attraction member is arranged in the second groove.

In some embodiments, a thickness of the first attraction member is equal to a depth of the first groove, so that the first attraction member is flush with an upper surface of the first groove; and a thickness of the second attraction member is equal to a depth of the second groove, so that the second attraction member is flush with an upper surface of the second groove.

In a second aspect, this application provides a method for controlling an electric winder, comprising:

detecting, by the strain sensor, deformation information of the contact assembly;

sending, by the strain sensor, the deformation information to the controller;

receiving, by the controller, the deformation information; and judging, by the controller, whether the deformation is greater than the deformation threshold;

if yes, controlling the drive mechanism to be in a stop state to prevent the reel from winding; and if not, judging whether a winding start signal is received; if yes, judging whether a voltage input by a power module is within a preset range; if yes, controlling the drive mechanism to be in a working state to drive the reel to perform winding.

In some embodiments, the method further comprises:

if the deformation is not greater than the deformation;

determining whether a winding stop signal is received; and if yes, cutting off an input of the voltage.

Compared to the prior art, the present invention has the following beneficial effects.

In the electric winder of this application, when a plug is inserted into the contact assembly through the insertion hole, the strain sensor detects a deformation of the contact assembly caused by the plug, and sends the deformation to the controller. The controller receives the deformation sent from the strain sensor. When the deformation is greater than a deformation threshold, the controller controls the drive mechanism to be in a stop state to prevent the reel from winding. In this way, when the plug is not pulled out from the socket, the reel will never start winding operation, which can prevent the socket on the free end of the cable from driving the plug on the tool to move when the user unplugs the electric winder firstly or when the external power supply is cut off, thus preventing the damage of the socket on the free end of the cable or the plug on the tool and improving the fault tolerance of the electric winder.

BRIEF DESCRIPTION OF THE DRAWINGS

The disclosure will be described below with reference to the accompanying drawings to make the technical solutions of the present clearer. Obviously, presented in the drawings are only some embodiments of the present application. Other drawings obtained by those of ordinary skill in the art based on the content disclosed herein without sparing any creative efforts should still fall within the scope of the disclosure.

Figure 1:
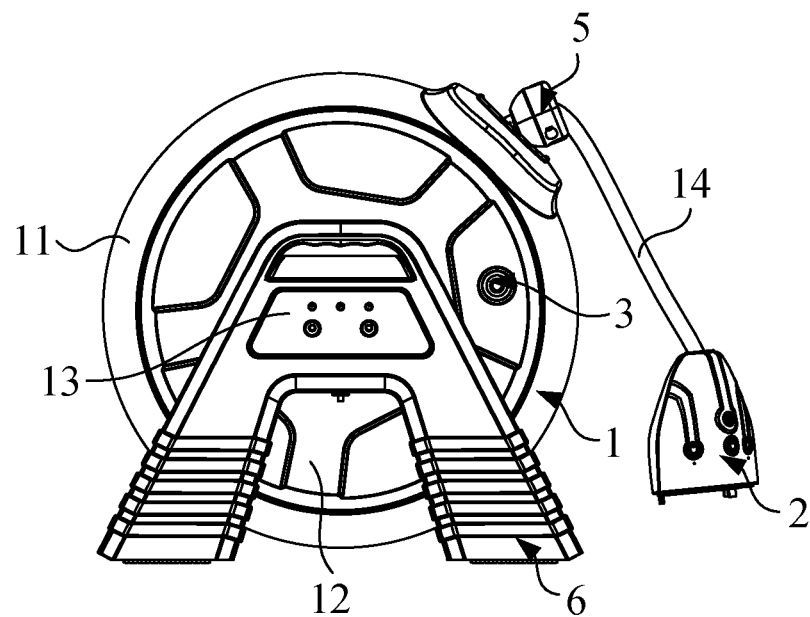
FIG. 1 is a schematic diagram of an electric winder according to an embodiment of the present disclosure.

In the drawings, 10, electric winder; 1, winder body; 11, first housing; 12, reel; 13, drive mechanism; 14, cable; 2, socket; 21, second housing; 22, insertion hole; 221, first insertion opening; 222, second insertion opening; 223, third insertion opening; 23, contact assembly; 231, first conductive contact; 232, second conductive contact; 233, guide portion; 2331, first bending portion; 2332, second bending portion; 24, strain sensor; 25, first attraction member; 3, controller; 4, plug; 41, second attraction member; 5, stopper; and 6, support.

DETAILED DESCRIPTION OF EMBODIMENTS

Technical solutions of the present disclosure will be described clearly and completely in conjunction with the accompanying drawings. Obviously, described below are only some embodiments of the disclosure. Based on the embodiments of the disclosure, all other embodiments obtained by those skilled in the art without sparing creative efforts shall fall within the scope of the disclosure.

It should be noted that terms, such as "up", "down", "left", "right", "front", "rear", in the embodiment of the present disclosure are only used to explain the relative position relationship and movement situation between the components under a certain posture (for example, shown in the accompanying drawings). If the specific posture changes, the directional indication changes accordingly.

As used herein, terms "first" and "second" are only illustrative, and cannot be understood as indicating or implying their relative importance or implicitly indicating the number of technical features referred to. Thus, the features defined by "first" or "second" may explicitly or implicitly indicate that at least one of the features is included. The term "and/or" includes any one of or any combination of two or more of the listed items. In addition, various embodiments can be combined with each other, in a manner that enables the implementation of the present disclosure by those skilled in the art, and the combination of the embodiments that is expected in an inappropriate way will not be considered as falling within the scope of the present disclosure.

Figure 2:
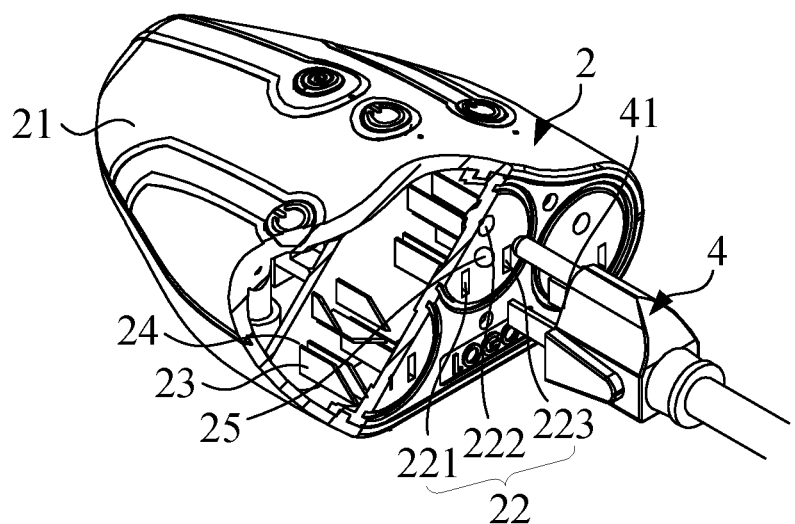
FIG. 2 is a schematic diagram of a socket and a plug according to an embodiment of the present disclosure.

As shown in FIGS. 1-2, an embodiment provides an electric winder 10, including a winder body 1, a socket 2 and a controller 3. The winder body 1 includes a first housing 11, a reel 12 arranged in the first housing 11, a drive mechanism 13 connected to the reel 12, and a cable 14 wound on the reel 12. The socket 2 includes a second housing 21, an insertion hole 22 provided on a side of the second housing 21, a contact assembly 23 provided in the insertion hole 22, and a strain sensor 24 arranged in the second housing 21 and attached to the contact assembly 23. The second housing 21 is arranged outside the first housing 11, and the contact assembly 23 is connected to a free end of the cable 14. The controller 3 is configured to control on/off of the drive mechanism 13 and is connected to the strain sensor 24. When a plug 4 is inserted into the contact assembly 23 through the insertion hole 22, the strain sensor 24 is configured to detect a deformation of the contact assembly 23 caused by the plug 4, and send the deformation to the controller 3. The controller 3 is configured to receive the deformation sent from the strain sensor 24; and when the deformation is greater than a deformation threshold, the controller 3 controls the drive mechanism 13 to be in a stop state to prevent the reel 12 from winding.

In some embodiments, when the plug 4 is inserted into the contact assembly 23 through the insertion hole 22, the strain sensor 24 is configured to detect a deformation of the contact assembly 23 caused by the plug 4, and send the deformation to the controller 3. The controller 3 is configured to receive the deformation sent from the strain sensor 24; and when the deformation is greater than a deformation threshold, the controller 3 controls the drive mechanism 13 to be in a stop state to prevent the reel 12 from winding. In this way, when the plug 4 is not pulled out from the socket 2, the reel 12 will never start winding operations, which can prevent the socket 2 on the free end of the cable 14 from driving the plug 4 on the tool to move when the user unplugs the plug 4 connected to the external power firstly or when the external power supply is cut off, thus preventing the damage of the socket 2 on the free end of the cable 14 or the plug 4 on the tool, and improving the fault tolerance of the electric winder 10.

Figure 3:
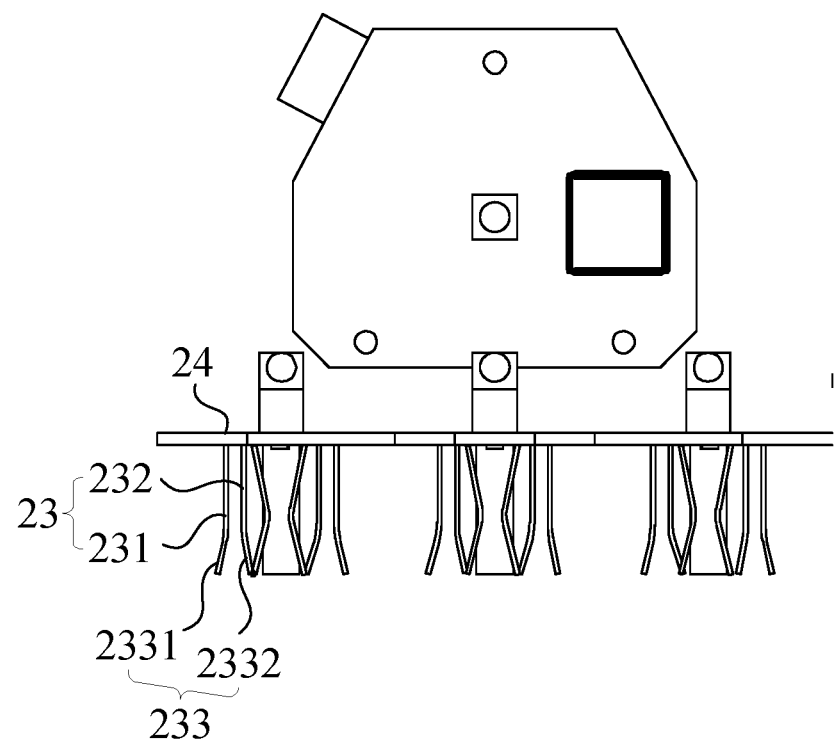
FIG. 3 is a schematic diagram of the socket according to an embodiment of the present disclosure.
Figure 4:
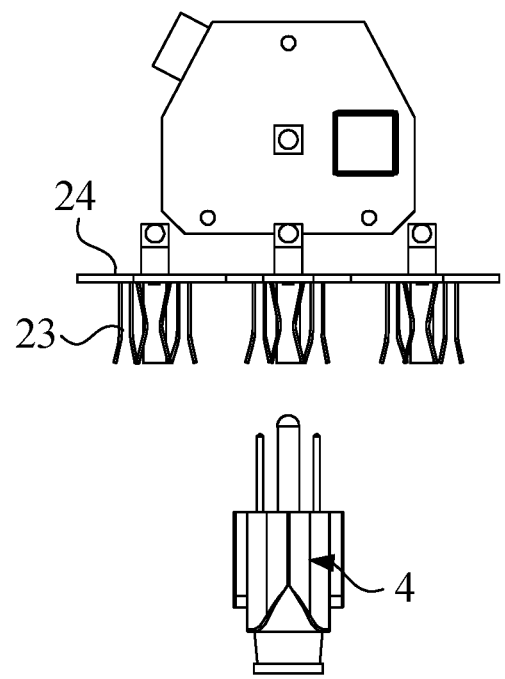
FIG. 4 is a schematic diagram of the socket and the plug according to an embodiment of the present disclosure, in which the plug is not inserted into the socket.
Figure 5:
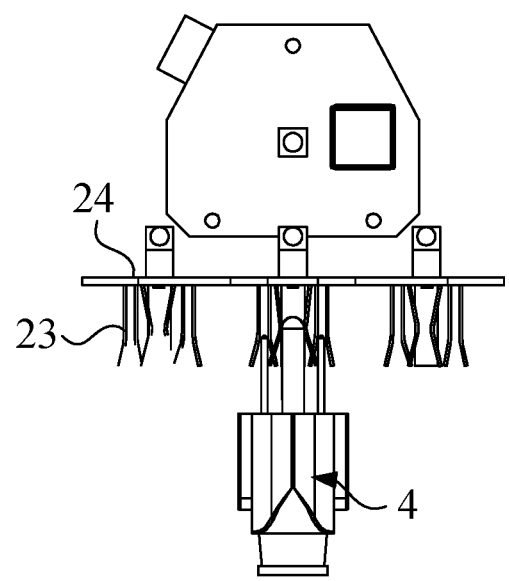
FIG. 5 is a schematic diagram of the socket and the plug according to an embodiment of the present disclosure, in which the plug is inserted into the socket.

As shown in FIGS. 3-5, the contact assembly 23 includes a first conductive contact 231 and a second conductive contact 232 opposite to each other, and the strain sensor 24 is attached to the first conductive contact 231 and the second conductive contact 232 respectively. When the plug 4 is inserted between the first conductive contact 231 and the second conductive contact 232 through the insertion hole 22, the strain sensor 24 detects the deformation of the first conductive contact 231 and the second conductive contact 232 caused by the plug 4, and sends the deformation to the controller 3. Through the cooperation of the first conductive contact 231 and the second conductive contact 232, the plug 4 can reliably contact the first conductive contact 231 and the second conductive contact 232, respectively, thereby improving the detection accuracy of the strain sensor 24, so that the controller 3 can reliably control the winder body 1 to start winding or stop winding.

A guide portion 233 is provided at an end of the contact assembly 23 close to the insertion hole 22. This arrangement enables the plug 4 to be smoothly inserted into the contact assembly 23, thereby facilitating the connection between the plug 4 and the socket 2.

An end of the first conductive contact 231 close to the insertion hole 22 is bent towards a side away from the second conductive contact 232 to form a first bending portion 2331. An end of the second conductive contact 232 close to the insertion hole 22 is bent towards a side away from the first conductive contact 231 to form a second bending portion 2332. The first bending portion 2331 and the second bending portion 2332 form the guide portion 233. The cooperation of the first bending portion 2331 and the second bending portion 2332 enables the plug 4 to be smoothly inserted into the contact assembly 23, thereby facilitating the connection between the plug 4 and the socket 2.

As shown in FIG. 2, the socket 2 further includes a first attraction member 25 arranged on a side surface of the second housing 21. The plug 4 is provided with a second attraction member 41 for attracting the first attraction member 25. One of the first attraction member 25 and the second attraction member 41 is a magnetic element, and the other is a magnetic conductive element. In this way, when the plug 4 is inserted into the contact assembly 23 through the insertion hole 22, the socket 2 can tightly attract the plug 4 through the cooperation of the first attraction member 25 and the second attraction member 41. It can avoid problems, for example, the plug is hard to be inserted into the socket; the connection between the plug and the socket is loose or improper; and greater strength is required to separate the plug 4 and the socket 2, thereby improving the connection reliability between the plug 4 and the socket 2.

The insertion hole 22 includes a first insertion opening 221, a second insertion opening 222 and a third insertion opening 223. The first insertion opening 221, the second insertion opening 222 and the third insertion opening 223 are arranged in a triangle shape. The first attraction member 25 is arranged at a center of the triangle formed by the first insertion opening 221, the second insertion opening 222 and the third insertion opening 223, and has a safety distance away from the first insertion opening 221, the second insertion opening 222 and the third insertion opening 223 respectively. The second attraction member 41 is arranged at a position corresponding to the position of the first attraction member 25. Through such arrangement, the safety hazard caused by the conduction of the first attraction member 25 can be avoided, thereby improving the safety of the connection of the plug 4 and the socket 2.

A first groove (not shown) is provided at the center of the triangle formed by the first insertion opening 221, the second insertion opening 222 and the third insertion opening 223, and the first attraction member 25 is arranged in the first groove. The plug 4 is provided with a second groove (not shown) at a position corresponding to the first attraction member 25, and the second attraction member 41 is arranged in the second groove. This arrangement enables the plug 4 to be effectively inserted into the contact assembly 23, which can prevent the plug 4 from being ineffectively inserted into the contact assembly 23 due to the thickness of the first attraction member 25 and the second attraction member 41, thereby improving the connection reliability of the plug 4 and the socket 2.

A thickness of the first attraction member 25 is equal to a depth of the first groove, so that the first attraction member 25 is flush with an upper surface of the first groove. A thickness of the second attraction member 41 is equal to a depth of the second groove, so that the second attraction member 41 is flush with an upper surface of the second groove. In this way, the problem that the first attraction member 25 is easy to be damaged due to the fact that the first attraction member 25 protrudes out of the upper surface of the first groove can be avoided, thereby prolonging the service life of the first attraction member 25. In addition, the plug 4 can be completely inserted into the contact assembly 23, thereby improving the connection reliability of the plug 4 and the socket 2.

In some embodiments, the first attraction member 25 is a permanent magnet, and the second attraction member 41 is an iron sheet.

The electric winder 10 also includes a power module and a plug connected to the power module. The power module is connected to an external power source through the plug and is connected to the controller 3.

The socket 2 is also configured to send a wireless control signal to the controller 3. The controller 3 is configured to receive the wireless control signal sent from the socket 2 and control the winder body 1 to start winding or stop winding according to the wireless control signal.

In an embodiment, the wireless control signal includes a winding start signal and a winding stop signal.

Figure 6:
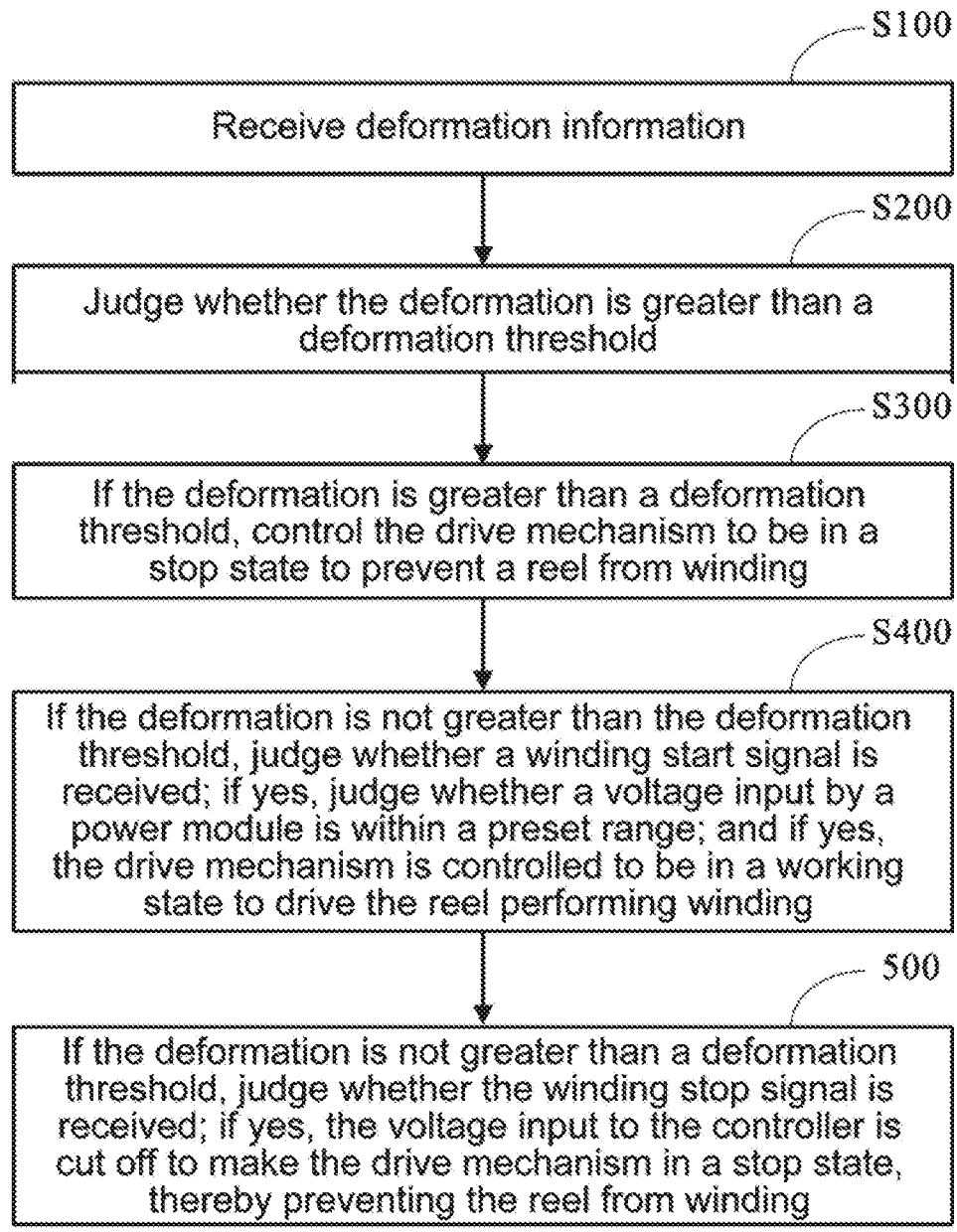
FIG. 6 is a flow chart of a method for controlling an electric winder according to an embodiment of the present disclosure.

As shown in FIG. 6, this embodiment illustrates a method for controlling the electric winder, including the following steps.

S100) Deformation information is received.

Specifically, the controller 3 receives the deformation information sent from the strain sensor 24.

S200) Whether the deformation is greater than a deformation threshold is determined.

Specifically, the controller 3 determines whether the deformation is greater than the deformation threshold.

S300) If the deformation is greater than the deformation threshold, the drive mechanism 13 is controlled to be in a stop state to prevent the reel 12 from winding.

In this way, when the plug 4 is not pulled out from the socket 2, the reel 12 will never start winding operation. This can prevent the socket 2 on the free end of the cable 14 from driving the plug 4 on the tool to move when the user unplugs the plug connected to the external power firstly or when the external power supply is cut off, thus preventing the damage of the socket 2 on the free end of the cable 14 or the plug 4 on the tool and improving the fault tolerance of the electric winder.

S400) If the deformation is not greater than the deformation threshold, whether the winding start signal is received is determined; if yes, whether a voltage input to the controller 3 by the power module is within a preset range is determined; if yes, the drive mechanism 13 is controlled to be in a working state to drive the reel 12 to perform winding.

Specifically, the controller 3 determines whether the winding start signal sent from the socket 2 is received, if yes, the controller 3 determines whether the voltage input to the controller 3 by the power module is within a preset range; if yes, the controller 3 controls the drive mechanism 13 to be in a working state to drive the reel 12 performing winding; otherwise, a voltage input of the controller 3 is cut off. This arrangement can ensure that the drive mechanism 13 is protected from damage caused by large voltages, thereby prolonging the service life of the drive mechanism 13.

Specifically, the controller 3 receives a current signal sent from the drive mechanism 13, and determines whether the current signal is greater than the current threshold; if yes, the voltage input of the controller 3 is cut off. This arrangement can ensure that the drive mechanism 13 is protected from damage caused by large currents, thereby prolonging the service life of the drive mechanism 13.

S500) If the deformation is not greater than the deformation threshold, whether a winding stop signal is received is determined; if yes, the voltage input of the controller 3 is cut off to make the drive mechanism 13 in a stop state, thereby preventing the reel 12 from winding.

As shown in FIGS. 1-2, in an embodiment, an electric winder 10 is provided. The electric winder 10 includes a winder body 1, a socket 2, a controller 3, and a support 6. The winder body 1 includes a first housing 11, a reel 12 arranged in the first housing 11, a drive mechanism 13 connected to the reel 12, and a cable 14 wound on the reel 12. The first housing 11 and the support 6 are fixedly connected, and the controller 3 is arranged in the first housing 11. The socket 2 is arranged outside the first housing 11 and connected to the free end of the cable 14. The socket 2 is configured to send a wireless control signal to the controller 3; and the controller 3 is configured to receive the wireless control signal sent from the socket 2 and control the reel 12 to start winding or stop winding according to the wireless control signal.

In an embodiment, the wireless control signal includes a winding start signal and a winding stop signal.

In the electric winder 10 of this embodiment, when the user needs to start winding, the user sends a winding start signal through the socket 2 to control the reel 12 to start winding; when the user needs to stop winding, the user sends a winding stop signal through the socket 2 to control the reel 12 to stop winding. The winding and the unwinding of the reel 12 are realized through wireless communication, which facilitates the use of the electric winder 10.

In an embodiment, the controller 3 includes a main control board 31 and a communication board 32.

Figure 7:
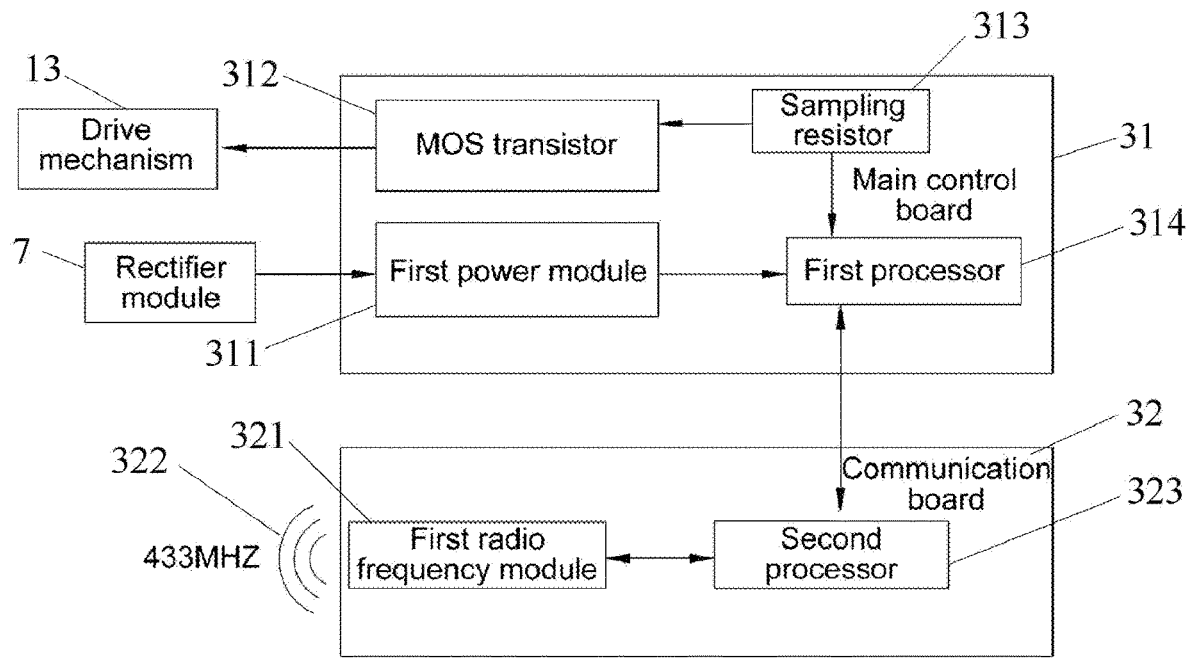
FIG. 7 is a block diagram of a controller according to an embodiment of the present disclosure.

As shown in FIG. 7, the main control board 31 includes a first power module 311, a metal oxide semiconductor (MOS) driving transistor 312, a sampling resistor 313 and a first processor 314. The first power module 311 is configured to supply power to the main control board 31 and the socket 2. The MOS driving transistor 312 is configured to drive the drive mechanism 13 to rotate. The sampling resistor 313 is configured for overcurrent protection of the drive mechanism 13. The first processor 314 is configured to control on/off of the drive mechanism 13.

Specifically, an input terminal of the first power module 311 is electrically connected to an external rectifier module 7. A 3.3V output terminal of the first power module 311 is electrically connected to the first processor 314, and a 5V output terminal of the first power module 311 is electrically connected to a control electrode of the MOS driving transistor 312. An end of the sampling resistor 313 is electrically connected to an input electrode of the MOS driving transistor 312, and the other end of the sampling resistor 313 is electrically connected to the first processor 314. An output electrode of the MOS driving transistor 312 is electrically connected to the drive mechanism 13.

In an embodiment, the first power module 311 is a voltage transformation and stabilization module, and the first processor 314 is a microcontroller unit (MCU).

As shown in FIG. 7, the communication board 32 includes a first radio frequency module 321, a wireless module 322 and a second processor 323. The first radio frequency module 321 is used for radio frequency communication with the socket 2, and the wireless module 322 is used for carrying out wireless communication with a terminal application (APP) or third-party voice equipment and the like. The second processor 323 is used to process communication data of the first radio frequency module 321 and the wireless module 322.

In some embodiments, the first radio frequency module 321, the wireless module 322 and the first processor 314 are respectively electrically connected to the second processor 323, and the first radio frequency module 321 and the 3.3V output terminal of the first power module 311 are electrically connected.

In some embodiments, the first radio frequency module 321 is an SI4432 module, and the wireless module 322 is a WIFI module, a bluetooth module, or a combination of a WIFI module and a bluetooth module. The third-party voice device is Tmall Genie, Xiaomi Xiaoai, Amazon alexa, or Google home assistant, etc. The second processor 323 is the MCU.

In the electric winder 10 of this embodiment, the wireless control signal is sent to the communication board 32 through the socket 2. The first radio frequency module 321 of the communication board 32 receives the wireless control signal sent from the socket 2 and sends the wireless control signal to the second processor 323 and the first processor 314 in turn. The first processor 314 receives the wireless control signal sent from the second processor 323, and controls the winder body 1 to start winding or stop winding according to the wireless control signal.

Figure 8:
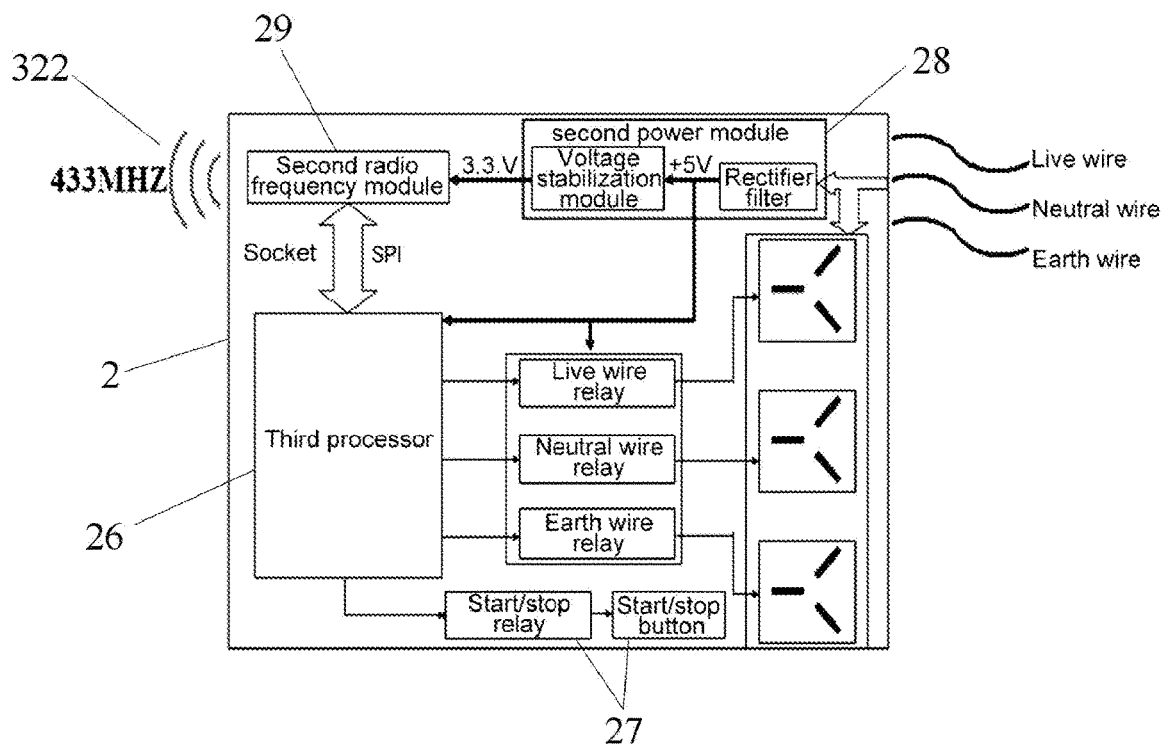
FIG. 8 is a block diagram of the socket according to an embodiment of the present disclosure.

In some embodiments, as shown in FIG. 8, the socket 2 includes a second power module 28, a second radio frequency module 29, a third processor 26 and a switch module 27. The second power module 28 is configured to supply power to the second radio frequency module 29 and the third processor 26. The second radio frequency module 29 is configured to receive a switch signal sent from the main control board 31 and send the switch signal to the third processor 26. The second radio frequency module 29 is also configured to receive the wireless control signal sent from the third processor 26 and send the wireless control signal to the main control board 31, so that the main control board controls the winder body 1 to start winding or stop winding according to the wireless control signal. The third processor 26 is configured to receive the switch signal sent from the second radio frequency module 29, and control on/off of a relay according to the switch signal, so as to control on/off of the alternating current of the switch module 27. The switch module 27 is configured to respond to a press signal of the user and send the press signal to the third processor 26. The third processor 26 receives the press signal sent from the switch module 27 and sends the corresponding wireless control signal to the second radio frequency module 29 according to the press signal.

In some embodiments, the power module includes a voltage stabilization chip and a rectifier filter.

An end of the second radio frequency module 29 is electrically connected to a 3.3V output terminal of the voltage stabilization chip, and the other end of the second radio frequency module 29 is electrically connected to the third processor 26. A 5V input terminal of the voltage stabilization chip is electrically connected to the rectifier filter, and the third processor 26 is electrically connected to the switch module 27.

In some embodiments, the third processor 26 is an ATmega32L type microcontroller 3, and the second radio frequency module 29 is the SI4432 module. The third processor 26 and the second radio frequency module 29 are electrically connected through an SPI serial port.

The switch module 27 includes a relay and buttons, and the buttons include a first button for starting or stopping winding and a second button for controlling on/off of the socket 2. An end of the relay is electrically connected to the third processor 26, and the other end of the relay is electrically connected to the first button and the second button, respectively.

In the electric winder 10 of this embodiment, when it is necessary to start the winding, the user presses the first button, and the first button sends the start signal to the third processor 26. The third processor 26 receives the start signal and sends a winding start signal to the second radio frequency module 29 according to the start signal. The second radio frequency module 29 receives the winding start signal and sends the winding start signal to the main control board 31. The first radio frequency module 321 on the main control board 31 receives the winding start signal, and sends the winding start signal to the second processor 323 and the first processor 314 in turn. The first processor 314 receives the winding start signal sent from the second processor 323, and controls the reel 12 to start winding. When it is necessary to stop the winding, the user presses the first button again, and the first button sends a stop signal to the third processor 26. The winding stop process is the same as the winding start process, and will not be described herein. The winding and the unwinding of the reel 12 are realized through wireless communication, which facilitates the use of the electric winder 10.

In an embodiment, the socket 2 includes three sets of contact assemblies and three sets of relays. The three sets of contact assemblies include a first set of contact assemblies, a second set of contact assemblies, and a third set of contact assemblies. The three sets of relays include a first set of relays, a second set of relays and a third set of relays. The three sets of relays and the three sets of contact assemblies are electrically connected in a one-to-one correspondence.

Each set of contact assemblies includes a live wire contact assembly and a neutral wire contact assembly and a earth wire contact assembly. Each set of relays includes a live wire relay, a neutral wire relay and a earth wire relay. The number of the switch buttons is three, i.e., the switch buttons include a first switch button, a second switch button and a third switch button.

The live wire relay in the first set of relays is electrically connected to the live wire contact assembly in the first set of contact assemblies, the first switch button and the third processor 26, respectively. The neutral wire relay in the first set of relays is electrically connected to the neutral contact assembly in the first set of contact assemblies, the first switch button and the third processor 26, respectively. The earth wire relay in the first set of relays is electrically connected to the earth wire contact assembly in the first set of contact wire assemblies, the first switch button and the third processor 26, respectively.

The live wire relay in the second set of relays is electrically connected to the live wire contact assembly in the second set of contact assemblies, the second switch button and the third processor 26, respectively. The neutral wire relay in the second set of relays is electrically connected to the neutral contact assembly in the second set of contact assemblies, the second switch button and the third processor 26, respectively. The earth wire relay in the second set of relays is electrically connected to the ground contact assembly in the second set of contact assemblies, the second switch button and the third processor 26, respectively.

The live wire relay in the third set of relays is electrically connected to the live wire contact assembly in the third set of contact assemblies, the third switch button and the third processor 26, respectively. The neutral wire relay in the third set of relays is electrically connected to the neutral contact assembly in the third set of contact assemblies, the third switch button and the third processor 26, respectively. The earth wire relay in the third set of relays is electrically connected to the ground contact assembly in the third set of contact assemblies, the third switch button and the third processor 26, respectively.

In the electric winder 10 of this embodiment, the socket 2 receives the switch signal sent from the communication board 32, and sends the switch signal to the third processor 26. The third processor 26 controls on/off of a corresponding set of relays (the live wire relay, the neutral wire relay and the earth wire relay), so as to control on/off of the alternating current of the corresponding set of contact assemblies.

In some embodiments, a top of the support 6 is provided with a hidden handle, and a bottom of the support 6 is provided with screw holes, and a bottom surface of the support 6 is horizontal.

The electric winder 10 of this embodiment is designed to be portable. The electric winder 10 can be fixed on a wall or a ceiling by screwing through the screw holes at the bottom of the support 6. It can also be placed on the ground through its horizontal bottom. The electric winder 10 can be moved conveniently by the hidden handle.

The electric winder 10 further includes a stopper 5 which is arranged on the cable 14 and is configured to abut the first housing 11 to prevent the free end of the cable 14 from entering the first housing 11, so that the user can use the socket 2 provided on the free end of the cable 14 conveniently.

The stopper 5 is movable along the cable 14. The length of the free end of the cable 14 exposed from the first housing 11 can be adjusted by adjusting the position of the stopper 5 on the cable 14, so that the user can use the socket 2 on the free end of the cable 14 more conveniently.

In an embodiment, the method for controlling the electric winder 10 specifically includes the following steps.

When the socket 2 receives a trigger signal sent from the first button, the socket 2 converts the trigger signal into a wireless control signal and sends the wireless control signal to the controller 3.

When the controller 3 receives the wireless control signal sent from the socket 2, the controller 3 controls the winder body 1 to start winding or stop winding according to the wireless control signal.

The winder body 1 is controlled to start or stop winding by sending a wireless control signal, and the winding and the unwinding of the reel 12 are realized through wireless communication, so as to realize the convenient use of the electric winder 10.

In some embodiments, the method for controlling the electric winder 10 further includes the following step. When the controller 3 receives a wireless control signal sent from other devices, the winder body 1 is controlled to start or stop winding according to the wireless control signal.

In some embodiments, the method for controlling the electric winder 10 further includes the following step. The controller 3 starts timing, and when the accumulated time is greater than or equal to the preset time, the controller controls the on/off of the input voltage, so as to control the winder body 1 to switch between a winding start state and a winding stop state.

In an embodiment, an automatic detecting method of the main control board 31 is provided, which specifically includes the following steps.

The main control board 31 is powered on to be initialized and provide test signals, and whether the voltage input to the main control board 31 by the first power module 311 is within a preset range is determined according to the test signal. If yes, the drive mechanism 13 is started and controlled to work at a constant speed; otherwise, the voltage input of the main control board 31 is cut off.

When the drive mechanism 13 is worked at a constant speed, whether the current of the drive mechanism 13 is greater than or equal to the current threshold is judged;
- if yes, the voltage input of the main control board 31 is cut off;
- otherwise, whether the winding stop signal sent from the first button is received is determined, and if yes, the voltage input of the main control board 31 is cut off to prevent the winder body from winding.

In some embodiments, the automatic detection method of the main control board 31 can keep the main control board 31 in a stable working state for a long time. When the voltage input to the main control board 31 by the first power module 311 is abnormal, the voltage input to the main control board 31 is cut off, so as to protect the electric winder 10, thereby significantly prolonging the service life of the electric winder 10.

The above are only the preferred embodiments of the present disclosure, and are not intended to limit the scope of the present disclosure. Any changes, equivalent modifications and improvements made by those skilled in the art without departing from the spirit of the present disclosure or uses in other related technical fields shall fall within the scope of the present disclosure.

What is claimed is:

1. An electric winder, comprising:
a winder body, comprising:
a first housing;
a reel arranged in the first housing;
a drive mechanism connected to the reel; and
a cable wound on the reel;
a socket, comprising:
a second housing;
an insertion hole provided on a side of the second housing;
a contact assembly provided in the insertion hole; and
a strain sensor arranged in the second housing and attached to the contact assembly; and
a controller, configured to control on/off of the drive mechanism;
wherein the second housing is arranged outside the first housing, and the contact assembly is connected to a free end of the cable; the controller is connected to the strain sensor; when a plug is inserted into the contact assembly through the insertion hole, the strain sensor is configured to detect a deformation of the contact assembly caused by the plug, and send the deformation to the controller; and
the controller is configured to receive the deformation sent from the strain sensor; and when the deformation is greater than a deformation threshold, the controller controls the drive mechanism to be in a stop state to prevent the reel from winding.

2. The electric winder of claim 1, wherein the contact assembly comprises a first conductive contact and a second conductive contact opposite to each other, and the strain sensor is attached to the first conductive contact and the second conductive contact, respectively; when the plug is inserted between the first conductive contact and the second conductive contact through the insertion hole, the strain sensor is configured to detect deformations of the first conductive contact and the second conductive contact caused by the plug and send the deformations to the controller.

3. The electric winder of claim 2, wherein a guide portion is provided at an end of the contact assembly close to the insertion hole.

4. The electric winder of claim 3, wherein an end of the first conductive contact close to the insertion hole is bent towards a side away from the second conductive contact to form a first bending portion; and an end of the second conductive contact close to the insertion hole is bent towards a side away from the first conductive contact to form a second bending portion; and the first bending portion and the second bending portion together form the guide portion.

5. The electric winder of claim 1, wherein the socket further comprises a first attraction member arranged on a side surface of the second housing, and the plug is provided with a second attraction member for attracting the first attraction member; and one of the first attraction member and the second attraction member is a magnetic element, and the other is a magnetic conductive element.

6. The electric winder of claim 5, wherein the insertion hole comprises a first insertion opening, a second insertion opening and a third insertion opening which are arranged in a triangle shape; the first attraction member is arranged at a center of the triangle formed by the first insertion opening, the second insertion opening and the third insertion opening, and has a safety distance away from the first insertion opening, the second insertion opening and the third insertion opening respectively; and the second attraction member is arranged at a position corresponding to the first attraction member.

7. The electric winder of claim 6, wherein a first groove is provided at the center of the triangle formed by the first insertion opening, the second insertion opening and the third insertion opening, and the first attraction member is arranged in the first groove; the plug is provided with a second groove at a position corresponding to the first attraction member, and the second attraction member is arranged in the second groove.

8. The electric winder of claim 7, wherein a thickness of the first attraction member is equal to a depth of the first groove, so that the first attraction member is flush with an upper surface of the first groove; and a thickness of the second attraction member is equal to a depth of the second groove, so that the second attraction member is flush with an upper surface of the second groove.

9. A method for controlling the electric winder of claim 1, comprising:
- detecting, by the strain sensor, deformation information of the contact assembly;
- sending, by the strain sensor, the deformation information to the controller;
- receiving, by the controller, the deformation information; and
- judging, by the controller, whether the deformation is greater than the deformation threshold;
- if the deformation is greater than the deformation threshold, controlling the drive mechanism to be in a stop state to prevent the reel from winding; and
- if the deformation is not greater than the deformation threshold, judging whether a winding start signal is received; if winding start signal is received, judging whether a voltage input by a power module is within a preset range; if the voltage input is within a preset range, controlling the drive mechanism to be in a working state to drive the reel to performing winding.

10. The method of claim 9, further comprising:
- if the deformation is not greater than the deformation threshold,
- determining whether a winding stop signal is received; and if the winding stop signal is received, cutting off the voltage input.

* * * * *